June 1, 1965  D. L. VE NARD  3,187,211
STATOR CONSTRUCTION FOR HIGH-PRECISION ELECTRICAL INSTRUMENTS
Filed May 3, 1962  3 Sheets-Sheet 1
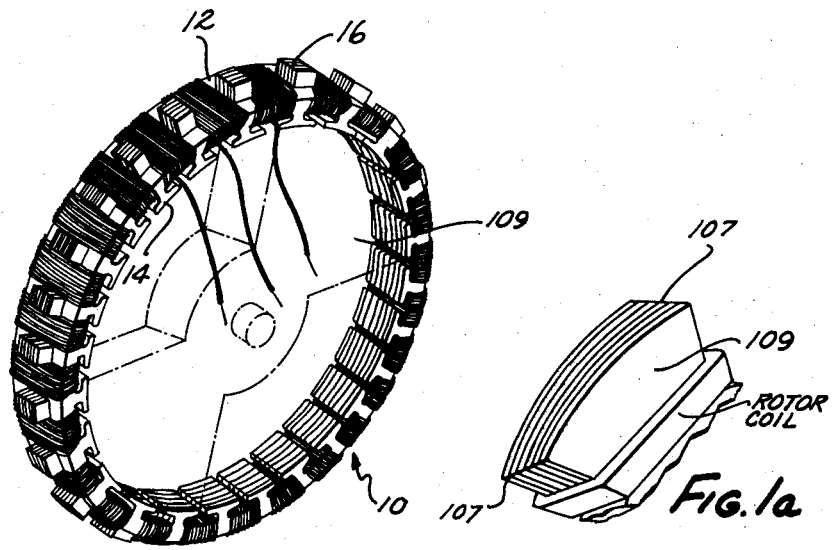
Fig. 1
Fig. 1a
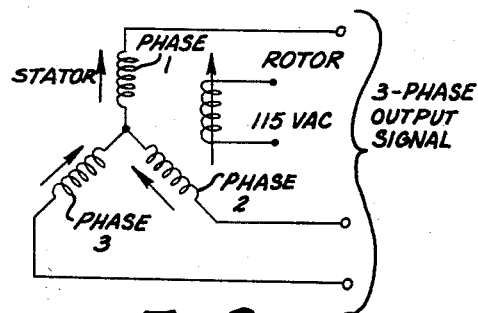
Fig. 2
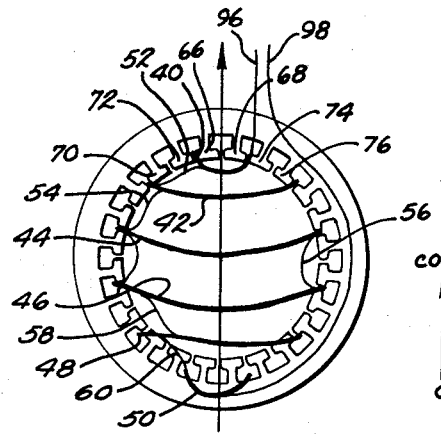
Fig. 3 PRIOR ART
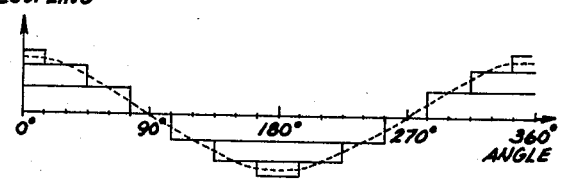
Fig. 4 PRIOR ART
INVENTOR.
DAN L. VENARD
BY Price & Heneveld
ATTORNEYS June 1, 1965　　　D. L. VENARD　　　3,187,211
STATOR CONSTRUCTION FOR HIGH-PRECISION ELECTRICAL INSTRUMENTS
Filed May 3, 1962　　　　　　　　　　　　　　3 Sheets-Sheet 2

INVENTOR.
DAN L. VENARD
BY Price & Heneveld
ATTORNEYS

June 1, 1965

D. L. VE NARD 3,187,211

STATOR CONSTRUCTION FOR HIGH-PRECISION ELECTRICAL INSTRUMENTS

Filed May 3, 1962

INVENTOR.
DAN L. VENARD
BY
*Price & Heneveld*
ATTORNEYS

United States Patent Office 3,187,211
Patented June 1, 1965

3,187,211
STATOR CONSTRUCTION FOR HIGH-PRECISION
ELECTRICAL INSTRUMENTS
Dan L. Ve Nard, Grand Rapids, Mich., assignor to
Lear Siegler, Inc.
Filed May 3, 1962, Ser. No. 192,249
12 Claims. (Cl. 310—166)

This invention concerns stators for polyphase electromagnetic induction devices of the pancake type, and more particularly an improved winding configuration therefor.

The success of supersonic aircraft, missiles, and astronautical vehicles is vitally affected by the availability of extremely accurate, miniaturized, and yet relatively inexpensive gyroscopic equipment. An essential part of such gyroscopic equipment is a toothed stator in which a gyroscopically controlled rotor induces voltages which are transmitted to indicating instruments or automatic control circuits to indicate and control the direction and attitude of the vehicle. Such stators are preferably of pancake configuration, i.e. their stack thickness is less than 75% of their inner diameter. Their shape and size is dictated by the movability requirements of the gyroscope gimbals, and by the permissible weight and size of the completed gyroscopic control unit.

In the regions of accuracy (plus or minus one minute of arc or less) which the latest technological advances require in instruments of this type, a number of factors which are normally inconsequential in electrical machinery assume considerable importance as sources of error which must be eliminated in order to achieve the necessary accuracy tolerances without disproportionate costs. In addition, stators of the pancake type are inherently more susceptible to manufacturing errors than those of the barrel type. These errors can generally be classified as arising from (a) properties of the raw material, (b) handling and manufacturing problems, or (c) design factors. As a matter of example, the following error sources, listed not necessarily in order of their importance, affect the performance of devices of the type discussed herein:

(1) Variation of flux from tooth to tooth due to inaccuracy of the lamination stampings.

(2) Variation of flux from one portion of the stator to another due to elliptical deformation of the stator in manufacture and handling after the laminations have been assembled together.

(3) Harmonic error due to insufficient skew of the magnetic gaps in view of the low stack of laminations, either because of flux variations in the gap, or because of an insufficiently smoothed step effect as the rotor moves from one tooth to the next.

(4) Variation of the induced voltage from tooth to tooth due to mispositioning of the turns or windings, faulty forming of the coils, faulty lacing or wedging.

(5) Spurious induced voltages in long terminal leads connecting individual coils to the tap-off point where external leads are connected.

(6) Harmonic and quadrature currents due to eddy currents flowing in the smear plane where the laminations are ground following assembly of the laminations.

(7) Variation of flux between phases due to slight deformities in the air gaps.

(8) Inherent error due to nonsinusoidal configuration of the windings about their phase axis.

(9) Variation of induced voltages under g-forces, shock or vibration due to insufficient mechanical strength of the stator.

(10) Harmonic distortion due to excessive flux density in the lamination material or overloading of the output circuit, or to imperfections in the magnetic properties of the lamination material.

The present invention minimizes all of the above-listed sources of error by (a) decoupling the windings from the smear plane; (b) coupling the windings to the yoke instead of the teeth; (c) distributing the windings in the various windows of the stator to achieve a substantially sinusoidal winding characteristic; (d) distributing the windings over the entire perimeter of the stator; and (e) balancing the number of turns of the various phases in each window so that their algebraic sum is zero, thereby avoiding the necessity of mutual coupling between phases which makes the prior art windings sensitive to variations in the physical position of the windings in the windows.

All of the above solutions are achieved by toroidally winding the stator. In addition, the toroidal winding requires far less space adjacent the lamination stack than does the commonly used wound teeth method. This in turn makes posssible a higher stack for the same space allotment, which in turn permits the use of a straight slot in the stator instead of a skewed one as was heretofore necessary. This in turn simplifies mechanical toroidal winding with the consequent manufacturing advantages of speed, accuracy of turn count, and elimination of lacing, forming, and wedging operations. The toroidal winding also makes possible at reasonably low cost the use of idealized windings (i.e. windings in which the turns are sinusoidally distributed around the circumference of the stator). Furthermore, the fact that such windings can encircle the entire stator results in the elimination of long leads from the coils to the tap-off points because each winding can be tapped at any convenient point along the periphery of the stator.

It is therefore the primary object of this invention to provide a winding arrangement which substantially eliminates mechanical manufacturing and handling damage as a cause of inaccuracy in miniaturized high-precision polyphase electromagnetic induction devices.

It is another object of this invention to produce such devices in smaller sizes, yet with greater accuracy and loadability and at lower cost than was heretofore possible.

It is a further object of this invention to provide a method of winding pancake stators which results in improved loadability, compensates for manufacturing defects, and yet allows the use of mechanical winding methods to achieve greater product reliability, a substantial reduction in scrap, and considerable savings in cost.

These and other objects of this invention will become apparent from the following specification, taken in connection with the accompanying drawings in which:

FIG. 1 is a perspective view of the device of this invention, showing the rotor in phantom lines;

FIG. 1a is a fragmentary perspective view showing the skew of the rotor;

FIG. 2 is a diagrammatic representation of the electrical circuitry of the device of FIG. 1;

FIG. 3 is a schematic representation of one phase of one type of prior art winding;

FIG. 4 is the coupling diagram for the winding of FIG. 3;

Figure 5:
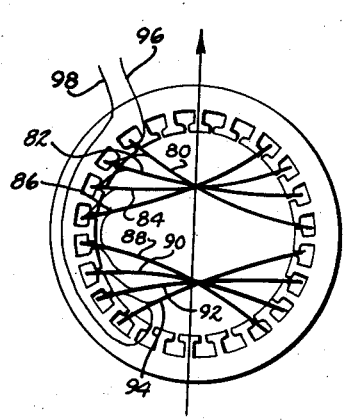
FIG. 5 is a schematic representation of one phase of another type of prior art winding.

Basically, the invention teaches the use of a toroidally wound laminated stator for polyphase electromagnetic induction devices which are herein described in connection with gyroscopic equipment, but which can be used equally well in resolvers, torque motors, or any other device of the same general nature in which extreme accuracy is a dominant consideration. In the novel toroidal winding method disclosed herein, each phase winding is distributed around the entire periphery of the stator and has one or more turns in each window of the stator. For example, in a three-phase device, each window contains a portion of each of the three phase windings. In order to achieve the benefits of this invention, the relative proportions of the three phase windings in a given window are determined by the inventive requirement that each winding be sinusoidally distributed around the periphery of the stator, and that the algebraic sum of the turns of the three winding portions in any given window always total zero, taking into account both the number and the winding direction of the turns.

Referring now to the drawings, FIG. 1 shows a pancake stator of the type involved in this invention, the rotor associated therewith being shown in phantom lines. The stator 10 is composed of a stack of laminations 12 whose total thickness in an axial direction does not exceed 75% of the smallest inner diameter of the stator taken between two diametrically opposed teeth 14. In the device of FIG. 1, a number of laminations in the center of the stack 12 are provided with outer teeth 16 radially aligned with the inner teeth 14. The outer teeth 16 serve as mechanical retaining members to hold the stator in its housing, and as pivot members at those points where the winding direction of a given winding is changed. They also serve as spacing members to hold the winding portions for a given window separated from the winding portions of the adjacent window.

Figure 9:
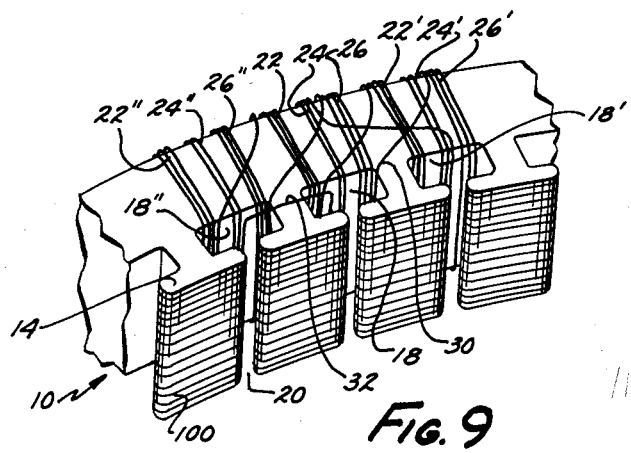
FIG. 9 is an enlarged detailed view of a window of a stator wound in accordance with this invention.

A detailed view of a section of the stator 10 is shown in FIG. 9. FIG. 9 clearly shows the laminations 12 which are stacked together to form the stator 10. Each pair of adjacent teeth 14 define between them a window 18 which communicates with the interior of the stator 10 through an air gap 20. Each window 18 contains a portion 22 of a first phase winding, a portion 24 of a second phase winding, and a portion 26 of a third phase winding. The number of turns in each of the portions 22, 24, 26 varies from window to window in a manner hereinafter described. The winding portion 22 in the window 18 is connected to the winding portion 22' in the window 18' by a wire 28. Likewise, the winding portion 26 is connected to the corresponding winding portion 26' in window 18' by a wire 30. The winding portion 24 is connected to the winding portion 24' in window 18' by a wire 32 which, it will be noted, is looped over the bridge portion 34 of tooth 14 and then brought downward again. It will be apparent from FIG. 9 that the winding direction of the portion 24' is opposite to the winding direction of the portion 24. Consequently, a reversal of the winding direction occurs between portions 24 and 24', but not between portions 22 and 22' nor between portions 26 and 26'. Furthermore, it will be readily evident from an inspection of FIG. 9 that no winding direction reversal occurs between any of the winding portions in window 18" and the corresponding winding portions in window 18. The reason for this selective reversal of winding direction will be explained subsequently herein.

In order to eliminate harmonics in the angular response curve which would result in an irregular relationship between the angular position of the rotor and the voltages induced in the three phases of the stator windings, it is necessary that each phase winding be coupled to the magnetic flux path of the stator in such a way that the graph of coupling factor vs. angular position on the stator is substantially sinusoidal, with a maximum at the phase axis and a minimum at 90° on each side of the phase axis. Because of the fact that the rotor has two opposite poles spaced 180° apart, the windings in the upper half of the stator (i.e. on one side of the phase axis) are wound in one direction, and the windings in the lower half of the stator (i.e. on the other side of the phase axis) are wound in the opposite direction, so that when the windings are connected in series, the voltages induced therein will be in aiding phase relationship.

Figure 6:
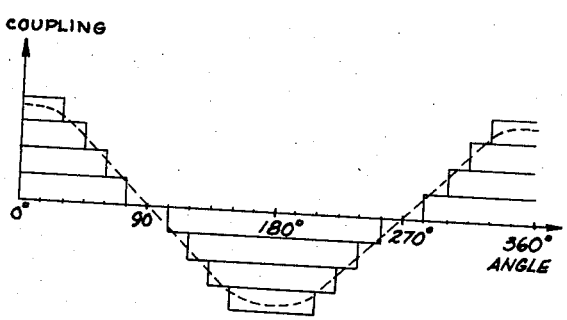
FIG. 6 is the coupling diagram for the winding of FIG. 5.
Figure 7:
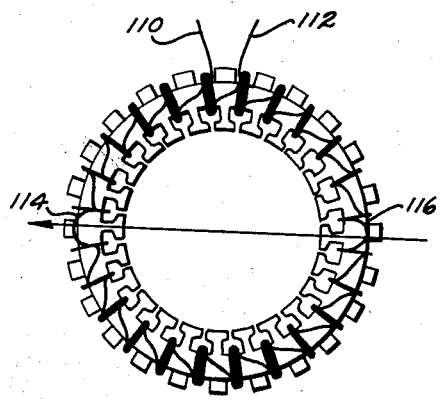
FIG. 7 is a schematic representation of one phase of a winding wound in accordance with this invention.
Figure 8:
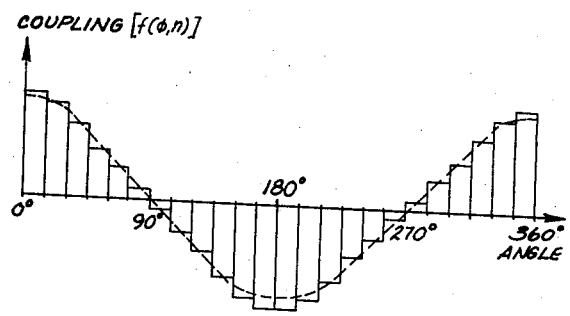
FIG. 8 is the coupling diagram for the winding of FIG. 7.

FIGS. 3 through 6 graphically show why it was difficult in prior art devices to obtain this sinusoidal distribution characteristic, and FIGS. 7 and 8 show how this difficulty is solved by the device of this invention. FIG. 3 shows one type of prior art winding known as a concentric winding. This winding consists of three separate and distinct coils 40, 42, 44 wound in one direction, and three separate coils 46, 48, 50 wound in the opposite direction. The coils 40 through 50 are all series connected by wires 52 through 60, and the entire winding is connected to the other phase windings and to the output by tap-off leads 96, 98.

It will be noted that coil 40 is inductively coupled to teeth 66 and 68; coil 42 is inductively coupled to teeth 70, 72, 66, 68, 74 and 76; and so forth. The coupling diagram can therefore be represented as in FIG. 4, in which the height of the rectangles indicates the amount of coupling as determined by the number of turns of each coil, and the length of the rectangles represents the number of teeth to which the particular coil is coupled. The diagram of FIG. 4 represents the coupling distribution starting with tooth 68 and going clockwise to tooth 66. It will be understood that throughout the discussion of FIGS. 3 through 8, only a single phase winding is discussed. The other two phase windings have identical characteristics but are physically displaced from the described phase winding by 120° in either direction.

In each of the devices here under consideration, the gaps of the rotor teeth and those of the stator teeth are non-parallel so as to effectively round off the sharp edges of the coupling diagram and produce a coupling curve indicated in dotted lines in FIGS. 4, 6 and 8.

It will be noted that in the prior art embodiment of FIG. 3, a sinusoidal distribution characteristic can be obtained only by using different numbers of turns in the coils 40, 42, 44. This is not only expensive, but it leads to manufacturing difficulties in that it increases the chances for winding errors and consequent rejects. In addition, this arrangement causes the total number of turns in adjacent alternate windows to vary, which in turn adds to the manufacturing difficulties and also causes new response errors.

Another commonly used prior art winding method is the lap winding shown in FIG. 5. This winding consists of four series-connected coils 80, 82, 84, 86 wound in one direction, and four series-connected coils 88, 90, 92, 94 wound in the other direction. Coils 80 and 94 are connected to the other phase windings and to the output by leads 96, 98. In this type of winding, the various coils must always have the same number of turns under penalty of shifting the phase axis. Consequently, as will be seen from the diagram of FIG. 6, a truly sinusoidal characteristic cannot be achieved with a winding of this type.

In addition, it will be seen that both the prior art embodiments of FIGS. 3 and 5 require at least one long tap-off lead 98 which extends about a substantial portion of the periphery of the stator and is there subject to spurious inductive coupling to the magnetic circuit of the stator.

Figure 12:
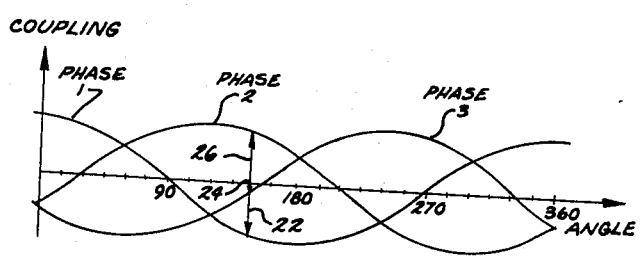
FIG. 12 is a diagram showing the voltages induced in the three phases of the stator of FIG. 1 as a function of angular displacement.

As opposed to these prior art methods, the device of this invention permits a completely even winding of the stator (i.e. the total number of turns in each window is the same) while at the same time maintaining a perfectly sinusoidal distribution of each phase winding. The notation $f(o,n)$ in the coupling diagram of FIG. 8 indicates that the actual coupling distribution is affected not only by the number $n$ of turns in a given window, but also by the magnetic flux $o$ in the core at that window. The latter depends on the physical shape of the rotor, being minimum at the rotor poles, and maximum at 90° from the rotor poles. This is achieved, as will readily appear from FIG. 7, by toroidally winding the stator so that instead of being coupled to the teeth, the three phase windings are coupled instead to the yoke and are thus each subjected to the same magnetic flux. The number of turns of a given winding in a given window is so chosen that the coupling characteristic of the winding is held as closely sinusoidal as possible in view of the design characteristics of a particular stator as hereinafter explained. If this is done, and there are three phase windings each displaced by 120° from the other, it will naturally follow, as illustrated in FIG. 12, that the total number of turns in each window is the same, and that the algebraic sum of the voltages induced in the three winding portions associated with each window is always zero; e.g. in window No. 1 of the example below, the voltage induced in the portion of phase 1 lying in window No. 1 by a given flux is +3 units; the voltage in the portion of phase 2 lying in window No. 1 is +18 units; and the voltage induced in the portion of phase 3 lying in window No. 1 is −21 units because this portion of phase 3 is wound in the opposite direction from the portions of phase 1 and phase 2. Consequently, the algebraic sum of the voltages induced in window No. 1 is 3+18−21=0.

It should be understood that although the inventive winding arrangement makes a perfectly sinusoidal distribution theoretically possible, it may be necessary to deviate therefrom in practice because it is not practical to wind fractional turns, i.e. there must always be a whole number of turns in each phase winding in each window. Inasmuch as loadability requirements and mechanical considerations normally preclude the use of hundreds of turns of fine wire in each window, particularly in small stators, a compromise is usually necessary in practice. In such a compromise, it is more important that the algebraic sum of turns in each window total zero than that the winding be sinusoidally distributed—the error eliminated by the latter is far less significant than the error eliminated by the former, particularly in view of the fact that the distribution of each winding around the entire perimeter of the stator in itself tends to reduce the (sixth) harmonic resulting from a non-sinusoidal distribution.

As an example, a typical stator made in accordance with the invention may be wound as follows:

| Window No. | 1 | 2 | 3 | 4 | 5 | 6 | 7 | 8 |
|---|---|---|---|---|---|---|---|---|
| Turns in phase 1 | 3 | 8 | 13 | 18 | 21 | 21 | 21 | 21 |
| Ideal number of turns in phase 1 | 2.9 | 8.4 | 13.4 | 17.5 | 20.4 | 21.8 | 21.8 | 20.4 |
| Turns in phase 2 | 18 | 13 | 8 | 8 | 8 | −3 | −13 | −18 |
| Ideal number of turns in phase 2 | 17.5 | 13.4 | 8.4 | 2.9 | 2.9 | −8.4 | −13.4 | −17.5 |
| Turns in phase 3 | −21 | −21 | −21 | −21 | −18 | −13 | −8 | −3 |
| Ideal number of turns in phase 3 | −20.4 | −21.8 | −21.8 | −20.4 | −17.5 | −13.4 | −8.4 | −2.9 |

| Window No. | 9 | 10 | 11 | 12 | 13 | 14 | 15 | 16 |
|---|---|---|---|---|---|---|---|---|
| Turns in phase 1 | 18 | 13 | 8 | 3 | −3 | −8 | −13 | −18 |
| Ideal number of turns in phase 1 | 17.5 | 13.4 | 8.4 | 2.9 | −2.9 | −8.4 | −13.4 | −17.5 |
| Turns in phase 2 | −21 | −21 | −21 | −21 | −18 | −13 | −8 | −3 |
| Ideal number of turns in phase 2 | −20.4 | −21.8 | −21.8 | −20.4 | −17.5 | −13.4 | −8.4 | −2.9 |
| Turns in phase 3 | 3 | 8 | 13 | 18 | 21 | 21 | 21 | 21 |
| Ideal number of turns in phase 3 | 2.9 | 8.4 | 13.4 | 17.5 | 20.4 | 21.8 | 21.8 | 20.4 |

| Window No. | 17 | 18 | 19 | 20 | 21 | 22 | 23 | 24 |
|---|---|---|---|---|---|---|---|---|
| Turns in phase 1 | −21 | −21 | −21 | −21 | −18 | −13 | −8 | −3 |
| Ideal number of turns in phase 1 | −20.4 | −21.8 | −21.8 | −20.4 | −17.5 | −13.4 | −8.4 | −2.9 |
| Turns in phase 2 | 3 | 8 | 13 | 18 | 21 | 21 | 21 | 21 |
| Ideal number of turns in phase 2 | 2.9 | 8.4 | 13.4 | 17.5 | 20.4 | 21.8 | 21.8 | 20.4 |
| Turns in phase 3 | 18 | 13 | 8 | 3 | −3 | −8 | −13 | −18 |
| Ideal number of turns in phase 3 | 17.5 | 13.4 | 8.4 | 2.9 | 2.9 | −8.4 | −13.4 | −17.5 |

In the above chart, a positive figure indicates, for example, turns wound clockwise, while a negative figure indicates turns wound counterclockwise. It will be noted that in the arrangement of the chart, the departure from the ideal sinusoid never exceeds 5% (in the prior art embodiment of FIG. 5, the smallest possible deviation tolerance obtainable is about ±8%), and that the algebraic sum of the turns in each window is always accurately zero.

This latter mathematical relationship between the three phase winding portions in each window has a great advantage in devices of this nature because it virtually eliminates the adverse effect of practically all mechanical manufacturing defects which result in even the minutest asymmetry of the flux path in the stator. This is so because although the net flux at each window may vary from window to window, the relative proportions of the voltages induced in the three phases by this flux are always constant. Consequently, asymmetry of the magnetic field in the stator of this invention can result only in a change of the total induced voltages involved, but never in an unbalance between the three phases. At the same time, it is no longer necessary in the device of the invention to rely on mutual coupling between the phases to even out any unbalance between them. Consequently, the stator of this invention is not as susceptible to physical variations in the position of the coils in the windows as were the prior art devices.

It will thus be seen that the use of the toroidal winding of this invention minimizes the effect of dimensional irregularities in the lamination stampings and out-of-roundness of the finished stator as a source of error. This source of error is material in devices requiring the extreme accuracies of the devices here under consideration and can be mechanically eliminated only by extremely expensive manufacturing techniques. Furthermore, the toroidal winding arrangement of this invention also minimizes errors arising in use due to minute physical deformations of the stator under the influence of severe vibration or large g-forces.

Another material error factor in prior art devices was the fact that even with the most expensive manufacturing techniques, a certain amount of short-circuiting between the laminations of the stator occurred when the face 100

(FIG. 9) of the teeth 14 was ground to an exact radius after assembly of the laminations 14. Technically, the surface 100 after machining is referred to as the smear plane, and minute eddy currents flowing in the smear plane were coupled at maximum coupling factor to the coils of the prior art embodiments which were substantially parallel to the smear plane. In the toroidal winding of this invention, however, the phase windings are disposed in planes normal to the smear plane. This reduces the coupling between the eddy currents in the smear plane and the phase windings to zero, so that the eddy currents in the smear plane are eliminated as a source of error.

Figure 10:
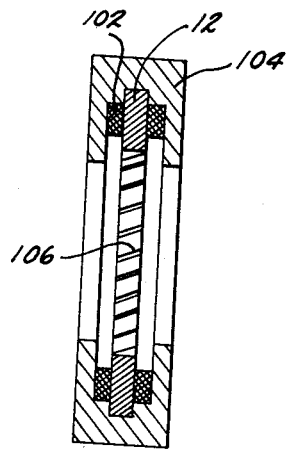
FIG. 10 is a vertical section of a prior art stator.
Figure 11:
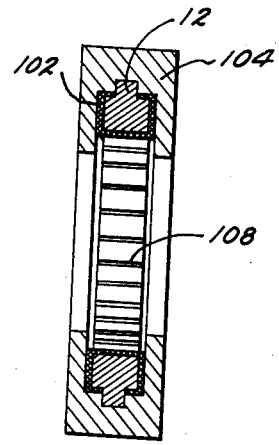
FIG. 11 is a vertical section of a stator wound in accordance with this invention and adapted to fit into the same housing as the stator of FIG. 10.

Referring now to FIGS. 10 and 11, it will be seen that in the typical prior art embodiment shown in FIG. 10, the thickness of the coils on either side of the stator laminations is considerable as compared to the stator lamination stack itself. In a typical example, the coil thickness in the prior art was twice the thickness of the stack of laminations. As shown in FIG. 11, a stator constructed according to this invention and dimensioned to fit the same housing 104 as the stator of FIG. 10, can have a much higher stack of laminations, the ratio of coil space to lamination space being on the order of 1 to 5.

The reduction of the required coil space 102 in the device of this invention permits the use of heavier wire than was heretofore possible, and the total length of the windings in a toroidal winding is also less than the total length of the windings in the prior art embodiments. As a result, the total winding resistance is markedly decreased. In addition, the higher stack of laminations made possible by the toroidal winding permits the use of a much greater total magnetic flux without exceeding the linear portions of the magnetic characteristics of the lamination material. Conversely, the inventive device can be driven at a lesser flux density and is therefore less subject to harmonic distortion from excessive flux density or from overloading of the output circuit; and consequently, the magnetic perfection of the lamination material is less critical.

The factors of reduced electrical resistance of the windings and increased total flux result in a considerable increase in loadability of the device, i.e. in the number of receiving devices which can be operated by a single transmitting device without causing harmonic distortion. The thicker stack also accounts for a much greater physical strength of the stator, and hence reduces its susceptibility to physical damage during manufacture and handling and under severe use conditions.

Because of the thinness of the stack required in the prior art embodiment of FIG. 10, it was previously necessary to skew the slots 106 of the stator as well as the edges 107 of the rotor 109 (FIG. 1a). The skew is necessary to create sufficient overlapping between the stator teeth and the rotor teeth in any angular position to smooth out the sharp corners of the coupling diagram into the coupling curve of FIGS. 4, 6 and 8. Distribution of the skew between the stator and rotor in the prior art was made necessary by the fact that the angle of skew was practically limited by the necessity of leaving the slot sufficiently wide to insert the coils therethrough.

By contrast, the inventive device of FIG. 11 has a sufficiently high stack that a sufficient amount of overlapping can be achieved by skewing only the rotor or stator. This allows the slots 108 of the stator to be made straight, with the resulting tremendous advantage that automatic winding machines can be used to wind the stator, thus eliminating the painstaking coil insertion, blocking and lacking which previously had to be done by hand. The fact that stators designed in accordance with the invention can be machine-wound results not only in an enormous time saving, but also drastically reduces the reject rate by eliminating the human factor in the assembly of the windings.

An inspection of FIG. 7 will also reveal that the toroidal winding can be connected to the other phase windings and to the output by short leads 110, 112 which can be located anywhere around the periphery of the stator and can consequently be kept very short and are therefore not subject to the influence of stray coupling.

It will be noted in FIG. 7 that the winding direction of the winding shown therein is reversed at points 114, 116 so that the lower half of the winding is in aiding relationship to the upper part of the winding as was previously explained in connection with FIGS. 3 and 5. The reversal of the winding at points 114, 116 has previously been described from a mechanical point of view in the description of FIG. 9 hereinabove.

It will be seen that the present invention provides a pancake stator for polyphase electromagnetic induction devices which permits far greater accuracy than was heretofore possible, by substantially eliminating all significant error sources in the accuracy regions demanded by modern astronautical equipment. By greatly improving the space utilization factor of the stator, the inventive device is either capable of heavier duty than a prior art device of the same size, or conversely, a device of the same load rating can be made far smaller by using the teachings of this invention. Finally, the automatic fabrication methods made possible by the inventive design drastically reduce the manufacturing costs of stators of comparable quality while improving rather than reducing their serviceability. Obviously, the invention can be carried out in many different ways of which the embodiment shown herein is merely illustrative. The invention is therefore not to be deemed limited by the embodiment shown herein or by the above description, but only by the scope of the following claims.

I claim:

1. In a polyphase electromagnetic induction device having a rotor and a toothed stator cooperating to establish a plurality of distinct magnetic flux paths through said teeth, each having a portion in common with others of said flux paths in the yoke of said stator, and having electrical windings for each phase coupled to said flux paths in a pattern symmetrical about a phase axis associated with said phase, the improvement comprising: said windings being toroidally disposed about said yoke in groups, each group located within one of a plurality of windows formed between each of said teeth; said windows each containing an equal number of windings consisting of a number of windings from each phase winding, which number for each phase winding differing for different windows; the physical arrangement of each phase winding as pertains to winding direction and the number of turns per group being in symmetrical relationship with respect to their respective phase axes.

2. The improvement of claim 1 as applied to an annular yoke, in which portions of each of said windings are distributed about said yoke at equally spaced intervals, the number and winding direction of the turns in each portion being so chosen that the voltage induced therein per unit of flux therethrough is substantially proportional to the sine of the angle between the winding axis of said portion and the phase axis of the winding.

3. The improvement of claim 2, in which each of said intervals contains one portion of each winding, and the relative number of turns and winding direction of the winding portions in said interval are so chosen that the algebraic sum of the voltages induced in the winding portions in said interval by a magnetic flux in said yoke equals zero.

4. A polyphase pancake-type electromagnetic induction device, comprising: a rotor radially polarized to produce a megnetic field; a generally annular stator surrounding said rotor, the axial thickness of said stator being less than 75% of its inside diameter; said stator including a continuous annular yoke having a plurality of teeth formed thereon and extending radially inwardly thereof, said teeth being separated by winding windows; a plurality of windings each toroidally wound about said yoke at a plurality of said windows; said windows each containing windings from each of said phases and the number of windings for at least one of said phases in each window being different than the number of windings of each of said other phases in the same window; the total number of windings in each window being equal.

5. The device of claim 4, in which said rotor has flux-carrying portions skewed with respect to the axis of rotation of said rotor; and in which the inner ends of said stator teeth are separated by gaps lying in planes which include the axis of rotation of said rotor.

6. The device of claim 4, in which the physical arrangement of each phase winding as to winding direction and number of turns per portion being symmetrical with respect to its phase axis.

7. The device of claim 6, in which the number of turns and winding direction of each said portion in any given window is so chosen that the algebraic sum of the voltages induced in all the portions in said window equals zero.

8. The device of claim 6, in which the number and winding direction of the turns in each portion is so chosen that the voltage induced therein per unit of flux therethrough is substantially proportional to the sine of the angle between the winding axis of said portion and the phase axis of the winding.

9. In a polyphase electromagnetic induction device having a rotor and a toothed stator cooperating to establish a plurality of distinct magnetic flux paths through said teeth, each having a portion in common with others of said flux paths in the yoke of said stator, and having electrical windings for each phase coupled to said flux paths in a pattern symmetrical about a phase axis associated with said phase, the improvement comprising: said windings being toroidally disposed about said yoke in groups, each located within one of a plurality of windows formed between each of said teeth; said windows each containing a number of windings from each phase winding, which number differs for different windows; the physical arrangement of each phase winding as pertains to winding direction and number of turns per group being in symmetrical relationship with respect to their respective phase axes; said windings of each phase overlapping the windings of the other phases in such a fashion that the total number of windings in each window are equal.

10. In a polyphase electromagnetic induction device having a rotor and a toothed stator cooperating to establish a plurality of distinct magnetic flux paths through said teeth, each having a portion in common with others of said flux paths in the yoke of said stator, and having electrical windings for each phase coupled to said flux paths in a pattern symmetrical about a phase axis associated with said phase, the improvement comprising: said windings being toroidally disposed about said yoke in symmetrical relationship with respect to their respective phase axes; said yoke being annular; and portions of each of said windings being distributed about said yoke at equally spaced intervals, the number and winding direction of the turns in each portion being so chosen that the voltage induced therein per unit of flux therethrough is substantially proportional to the sine of the angle between the winding axis of said portion and the phase axis of the winding.

11. The improvement of claim 10, in which each of said intervals contains one portion of each winding, and the relative number of turns and winding direction of the winding portions in said interval are so chosen that the algebraic sum of the voltages induced in the winding portions in said interval by a magnetic flux in said yoke equals zero.

12. A polyphase pancake-type electromagnetic induction device, comprising: a rotor radially polarized to produce a magnetic field; a generally annular stator surrounding said rotor, the axial thickness of said stator being less than 75% of its inside diameter; said stator including a continuous annular yoke having a plurality of teeth formed thereon and extending radially inwardly thereof, said teeth being separated by winding windows; and a plurality of windings having portions each toroidally wound about said yoke at a plurality of said windows, the number and winding direction of the turns in each portion being so chosen that the voltage induced therein per unit of flux therethrough in substantially proportional to the sine of the angle between the winding axis of said portion and the phase axis of the winding.

References Cited by the Examiner
UNITED STATES PATENTS

| 2,773,208 | 12/56 | Richardson | 310—267 |
| 2,790,098 | 4/57 | Nyyssonen | 310—254 |
| 2,971,106 | 2/61 | Westphalen | 310—166 |

MILTON O. HIRSHFIELD, *Primary Examiner.*